May 14, 1963

R. J. BRANHAM 3,089,190

FLARING MACHINE

Filed April 20, 1959

INVENTOR.
ROBERT J. BRANHAM.
BY
Lockwood, Woodard, Smith & Weikart.
ATTORNEYS.

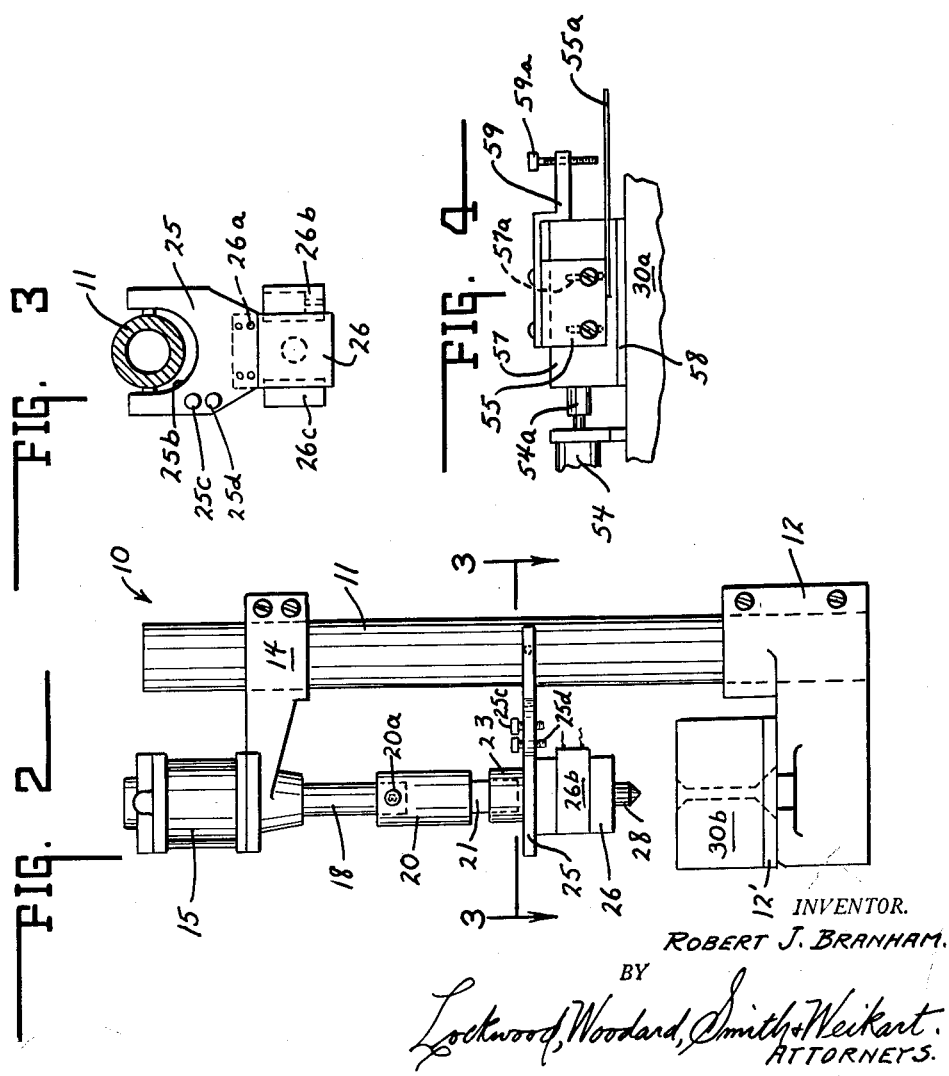

United States Patent Office 3,089,190
Patented May 14, 1963

3,089,190
FLARING MACHINE
Robert J. Branham, Indianapolis, Ind., assignor to Central Supply Company, Indianapolis, Ind., a corporation
Filed Apr. 20, 1959, Ser. No. 807,562
1 Claim. (Cl. 18—19)

The present invention relates to a flaring machine and more particularly to a new and improved apparatus for simply and effectively flaring the ends of hollow plastic tubing.

With the advent of widespread commercial uses of hollow plastic tubing over the past several years, there has been considerable demand and need for apparatus for flaring the ends thereof in a simple, uniform and yet rapid manner. Such desired apparatus would have to be versatile insofar as the particular plastic material involved was concerned and, of course, for different tubing diameter and length.

By virtue of the instant invention, the applicant has provided a novel apparatus for uniformly and rapidly flaring the ends of hollow plastic tubing, which apparatus has the degree of versatility necessary for use with any type plastic material and for the customer's particular dimensional specifications. The flaring machine forming the instant invention comprises, in general terms, a modified conventional air press having an air controlled tubing holding vise positioned on the base thereof. A movable piston forming part of the air press includes a heating unit with a flaring point on the free end thereof disposed above the tubing holding vise, which heating unit contains a thermostat so that temperature of the flaring point can be carefully controlled during the use of the apparatus.

Upon activation of the apparatus by an operator, an electrical switching element moves above an opening in the tubing holding vise through which the hollow plastic tubing is inserted. As soon as the tubing contacts the electrical switching element, the action of the flaring apparatus is automatic in that the jaws of the tubing holding vise then close onto the tubing to retain the latter therein for the flaring operation. Subsequently, through a novel air pressure control system, the piston of the air press moves downwardly, permitting the flaring point on the bottom of the heating unit to rest on the upstanding free end of the hollow plastic tubing, thereby heating the latter to a preselected temperature. Inasmuch as the air press is preferably of the double acting type, the second downward movement thereof forces the flaring point into the end of the already heated hollow plastic tubing and, thus, accomplishes the desired flaring action.

Various operational effects for the apparatus are achieved by the utilization of conventional two-way air valves in the air pressure control system therefor, which two-way valves are controlled, for example, during the operation of the apparatus by the downward movement of structure on the piston of the air press as well as by the movement of structure on a movable jaw of the tubing holding vise, all of which novel arrangements will be apparent from the discussion herebelow.

Accordingly, a principal object of the present invention is to provide a new and improved apparatus for flaring the ends of hollow plastic tubing.

Another object of the present invention is to provide a new and improved flaring machine having a floating type heating unit thereon which pre-warms the tubing being flared to any preselected desired temperature.

Another object of the present invention is to provide a new and improved flaring machine having a novel work holding vise which automatically grips and releases the tubing being flared.

A further object of the present invention is to provide a novel flaring apparatus having a movable heating element and work gripping vise, the movement thereof controlling the operational sequence of the apparatus.

A still further object of the present invention is to provide a new and improved flaring apparatus having a novel floating self-centering type flaring point thereon.

A still further and more general object of the present invention is to provide a novel air pressure system useful for controlling the operation of a new and improved apparatus for flaring the ends of hollow plastic tubing.

Other objects and a better understanding of the invention will become more apparent from the following description, taken in conjunction with the accompanying drawings, in which:

FIG. 2 is a view in side elevation of the flaring machine of FIG. 1, with the air pressure control system removed therefrom;

FIG. 3 is a view in horizontal section of a control feature used on the instant invention, taken at line 3—3 of FIG. 2 and looking in the direction of the arrows; and FIG. 4 is a detailed view in side elevation of the electrical switching mechanism which initiates the automatic operational sequence of the flaring machine forming the instant invention.

Figure 1:
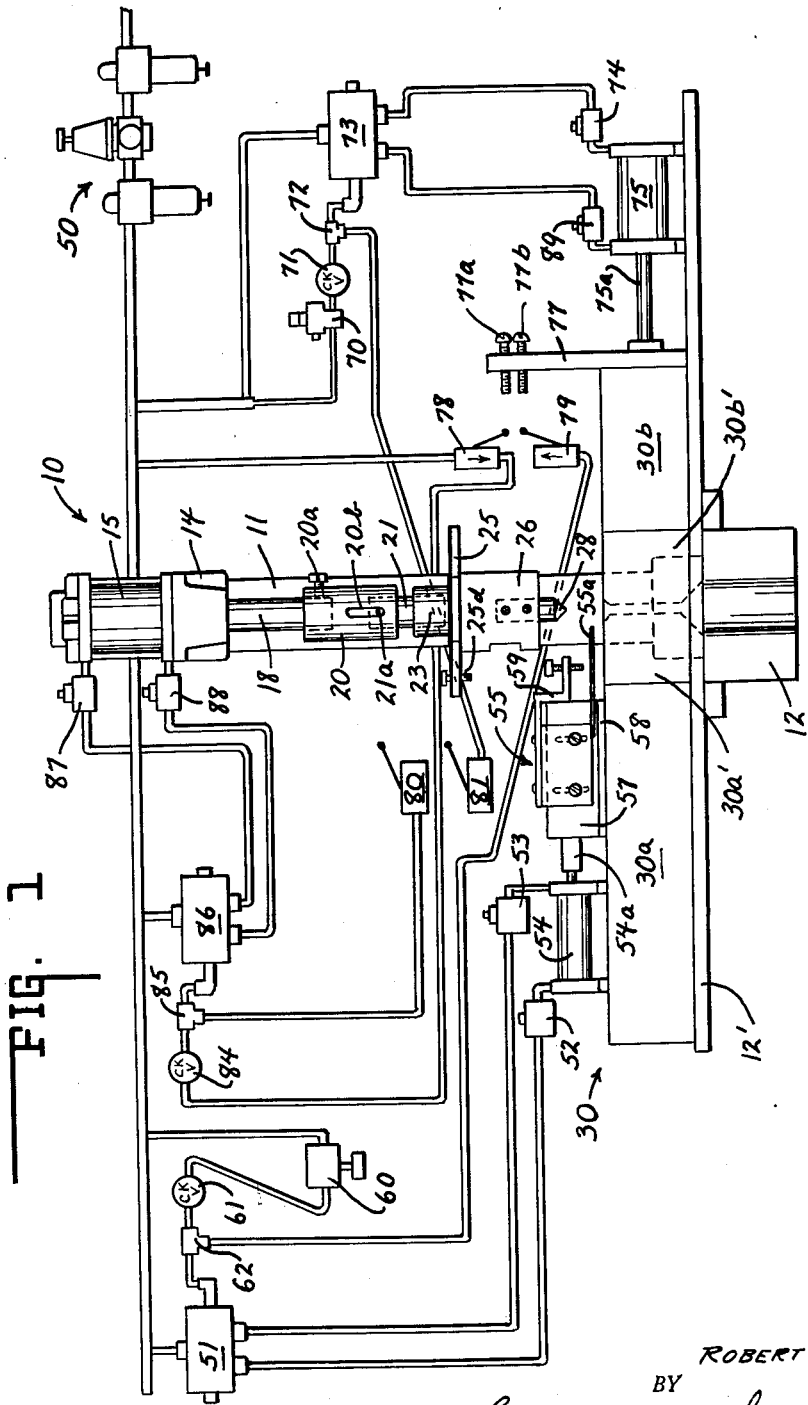
FIG. 1 is a view in front elevation showing the novel flaring machine forming the instant invention, together with a generally diagrammatic representation of the air pressure control system used therewith.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the figures, the applicant's novel flaring apparatus is developed, in the preferred embodiment of the invention, on a modified conventional type double acting air press 10, the latter comprising a mounting column 11 positioned on a base 12 and having a cylinder bracket 14 selectively positionable thereon. A power cylinder 15 is disposed on the cylinder bracket 14, with the power cylinder 15 connecting to the applicant's novel air pressure control system which is to be discussed more specifically herebelow. A vertically movable piston 18 in the form of a ground and polished cylinder is movable in response to the entrance and exit of air into the power cylinder 15 of the air press 10.

The aforedescribed conventional air press 10 is modified by the teachings of the instant invention by attaching a sleeve member 20 to the lower free end portion of the piston 18 by means of a common type set screw 20a. The sleeve member 20 has elongated openings 20b and 20c disposed on opposite sides thereof, which elongated openings 20b and 20c are adapted to receive a pin 21a which extends through a connecting cylinder 21 movable within the sleeve member 20. The connecting cylinder 21 has an end member 23 secured thereto, the latter attaching to a floating plate 25 which is secured to the top surface of a heating unit 26 by conventional flush type screws 26a, for example (see FIG. 3).

As should be apparent from FIG. 3, the floating plate 25 is generally irregular in shape, and a neck portion 25b thereon partly surrounds the column 11 of the air press 10 to prevent rotation of the piston 18 during operation. The floating plate 25 also includes adjustable contacts 25c and 25d thereon which are adapted to engage two-way valves 80 and 81 upon operation of the apparatus, which two-way valves 80 and 81 will be discussed more fully in connection with the air pressure control system for the apparatus.

The heating unit 26 disposed beneath and secured to the floating plate 25 has a removable flaring point 28 extending from the lower surface thereof and includes a heater 26b disposed therein as well as a thermostat 26c for controlling the temperature of the heater 26b and, hence, the removable flaring point 28. In the preferred embodiment of the invention, the heating unit 26 is formed from aluminum, or similar material, which serves as an effective heat transfer to the flaring point 28.

The removable flaring point 28 is accurately formed for the particular specifications of the flaring operation. Inasmuch as various diameter hollow plastic tubing will be employed in connection with the operation of the instant apparatus, the flaring point 28 is removable for versatility of use. In addition, for ease in replacement and repair, the heater 26b, which may be a standard cartridge type, as well as the thermostat 26c associated therewith, are also removable in the preferred embodiment of the invention.

It should be understood that the floating assembly at the bottom of the piston 18 including the floating plate 25, the heating unit 26 and the flaring point 28 affords the advantage of not transmitting heat from the heating unit 26 to the piston 18 and, hence, not effecting the operation thereof. The floating assembly also quite importantly permits the flaring point 28 to center itself within the end of the plastic tubing to achieve a desirable flared configuration.

With further reference to the overall structure of the flaring apparatus, the base 12 of the air press 10 is extended through an auxiliary base member 12' to receive a vice 30 thereon, which vise 30 is formed of stationary and movable jaws, 30a and 30b, respectively. The stationary and movable jaws 30a and 30b have faces 30a' and 30b', respectively, which surround and grip the plastic tubing which is inserted into a vertical opening formed by concave portions thereof. The faces 30a' and 30b' are accurately milled so that when the vise 30 is closed, and upon activation of the air pressure control system, the plastic tubing is firmly gripped into an operational position beneath the structure described above on the piston 18 of the air press 10. Again, as in connection with the flaring point 28 discussed hereabove, the faces 30a' and 30b', respectively, of the stationary and the movable jaws of the vise 30 are changeable, in the preferred form of the invention, depending, of course, upon the size of the tubing which must be gripped and held during the flaring operation.

Considering now the above-described structure of the applicant's novel flaring machine, without any discussion of the air control system therefor, it should be understood that as the piston 18 moves downwardly during the first operational stage of the air press 10, the relationship of sleeve member 20, the connecting cylinder 21, the end member 23, the floating plate 25, and the heating unit 26 are such that the flaring point 28 rests directly on the open end of the hollow plastic tubing which is positioned between the jaws of the vise 30. As the air pressure control system provides, in the electrical circuitry therefor, for energization of the heater 26b in the heating unit 26 and its associated control thermostat 26c, the flaring point 28 and the end of the hollow tubing are warmed to a preselected desired temperature.

During the second operational state of the air press 10, i.e. when the piston 18 moves to its lowest position, the sleeve member 20 moves downwardly with the piston 18 and the pin 21a holding the connecting cylinder 21 is then positioned at the upper ends of the elongated holes 20b and 20c on the sides of the sleeve member 20. Downward force is then exerted on this pin 21a and, hence, the connecting cylinder 21, the end member 23, the floating plate 25, and the heating unit 26 move downwardly, and the flaring point 28 on the bottom of the heating unit 26 is forced into the upwardly extending open end of the hollow tubing to achieve the desired flaring action.

With particular reference to the air pressure control system for the applicant's novel flaring apparatus, the main air is introduced from the desired air source (not shown) through a conventional combined lubricator-filter-regulator device 50, whereupon the air flow is through various internal circuits diagrammatically disclosed in FIG. 1. Considering now the internal air circuit pertinent to the initiation of the programming cycle for the overall apparatus, air flows through a first air path including a common four-way valve 51 and a flow control valve 52 to a double acting cylinder 54 which is preferably disposed upon the stationary jaw 30a of the vise 30 on the auxiliary base member 12' of the air press 10.

A second air path extends from the four-way valve 51 through a flow control valve 53 to the opposite end of the double acting cylinder 54, which two air paths are provided so that the double acting cylinder 54 may move in two directions to provide a push-pull effect. When the double acting cylinder 54 moves in the direction of the movable jaw 30b of the vise 30, a switch 55 which is slidably mounted on the stationary jaw 30a of the vise 30 moves therewith, and a contact arm 55a extending therefrom moves above the opening formed between the faces 30a' and 30b', respectively, of the stationary and movable jaws 30a and 30b of the vise 30. The tubing is introduced through the latter opening for initiating the flaring operation.

Referring particularly to FIGS. 3 and 4 for details of mounting the switch 55, a connector element 54a from the double acting cylinder 54 engages a movable bracket 57 which may, in a typical embodiment of the invention, slide within gibs 58 disposed on the top surface of the stationary jaw 30a of the vise 30. The movable bracket 57 has vertically extending elongated openings 57a in a vertical wall thereof, which elongated openings 57a are adapted to receive fastening elements, such as common screws, for example, which extend therethrough into the switch 55. As should be apparent, the elongated openings 57a are provided as means for vertically adjusting the position of the switch 55 with reference to the top surface of jaw 30a.

Inasmuch as the arm 55a on the switch 55 is generally of extended length, the application utilizes a control member 59 therewith which control member 59 is supported on top of the switch 55. The control member 59 has a common set screw 59a extending therethrough adapted to engage and thereby control the vertical displacement of the arm 55a on the switch 55. The control member 59 provides several operational advantages to the flaring apparatus which include minimizing the travel of the arm 55a to electrically close the switch 55; decreasing the operational time of the apparatus; and, controlling the length of hollow tubing which extends out of the closing vise 30 and, hence, the depth of the flare.

Relating the aforedescribed structure with reference to the overall operational sequence of the flaring apparatus, the operator of the machine activates a two-way valve 60 which charges the four-way valve 51 through check valve 61 and T-member 62, thereby operating the double acting cylinder 54. The piston (not shown) of the double acting cylinder 54 moves from left to right (in FIG. 1), moving the connector element 54a secured thereto and, hence, the switch 55. As the switch 55 moves on bracket 57 between the gibs 58, the contact arm 55a extending therefrom moves over the receiving hole in the vise 30 for the hollow tubing. With the switch contact arm 55a over the aforesaid hole, the operator pushes the hollow tubing up through the hole and into contact therewith, thereby electrically closing the switch 55 and initiating the automatic cycle of operation of the flaring apparatus. It should be noted that a conventional electrical circuit is used with the air pressure control system, and that it has been omitted from the drawings for reasons of clarity.

With the energization of the programming cycle, a normally closed solenoid controlled two-way valve 70 becomes energized and, hence, opens, and air flows through a check valve 71, a T-member 72, a four-way valve 73 and a flow control valve 74 to a double acting cylinder 75, which passage of air effects the closing of the movable jaw 30b of the vise 30, through a connector element 75a, onto the hollow tubing which is positioned in the opening formed by the concave portions of face 30b' thereof and the face 30a' of the stationary jaw 30a.

Upon movement of the movable jaw 30b of the vise 30 to its fully extended or closed position, a member 77 positioned on the movable jaw 30b engages two-way valves 78 and 79 through adjustable contacts 77a and 77b thereon, respectively, thereupon, through two-way valve 79, permitting the exhausting or bleeding of air from the four-way valve 51. The bleeding of air from the four-way valve 51 permits the movement of the double acting cylinder 54 from right to left (in FIG. 1) through an air circuit completed from the four-way valve 51 and flow control valve 53. The movement of the double acting cylinder 54, through connector element 54a, returns the switch 55 and the contact arm 55a therewith to its original position, thereby unblocking the path of the downward movement of the piston 18 to the hollow tubing for the flaring operation, to be discussed herebelow.

When the two-way valve 78 is engaged by the contact 77a of member 77, an air circuit is completed through check valve 84, T-member 85, four-way valve 86, and flow control valve 87 to the power cylinder 15 of the air press 10, and the piston 18 thereof moves in a downward direction so that, during the first operational movement thereof, the flaring point 28 rests in the free end of the hollowing tubing. Inasmuch as the heater 26b of the heating unit 26 has become energized upon activation of the air pressure control system, the hollow tubing becomes heated by the flaring point 28 to a preselected temperature, as discussed hereabove. Upon the second continued downward movement of the piston 18, flaring action is accomplished, as also discussed hereabove.

After flaring has been completed, two-way valves 80 and 81 are engaged by the adjustable contacts 25c and 25d which extend through the floating plate 25, which engagement effects an opening action for each, thereby, respectively, exhausting or bleeding of air from the four-way valves 86 and 73. The bleeding of the four-way valve 86 is accomplished through the T-member 85, whereupon the piston 18 is returned to its starting position through an air path including a flow control valve 88. The bleeding of the four-way valve 73 is accomplished through the T-member 72, whereupon air flows through flow control valve 89 to the double acting cylinder 75 which returns the movable jaw 30b of the work holding vise 30 to its normally open position. Hence, the cycle is completed, flaring action has been accomplished, and the apparatus is ready for the next complete operational cycle.

In a typical arrangement of components, it should be apparent that the two-way valves 80 and 81 are positioned adjacent each other, whereas the two-way valves 78 and 79 are positioned above each other, which preferred placement provides for the effective use thereof. Moreover, it should be understood that the above remaining components for the air pressure control system may be arranged as desired for use in conjunction with the air press, depending, of course, upon the space available therearound and other environmental factors.

From the preceding, it should be apparent that the applicant has invented a novel apparatus for flaring the ends of hollow plastic tubing, which apparatus requires little or no action by the operator after initial activation of the programming sequence. The applicant's apparatus employs a novel arrangement for pre-heating the hollow plastic tubing prior to the flaring operation, as well as for permitting the flaring point to self-center with reference to the positioned hollow tubing. By the use of interchangeable components, including, for example, the flaring point 28 and the faces on the jaws 30a and 30b of the work holding vise 30, it is possible to flare various diameter hollow tubing, and controlling the amount of vertical displacement of the control arm 55a extending from the switch 55 effects the depth of the flare.

The flaring apparatus described herein is susceptible to various changes within the spirit of the invention. For example, the size and shape of the floating plate 25 as well as the member 77 disposed on the movable jaw of the vise 30 may be varied, depending upon the ultimate design of the apparatus. Moreover, the switching mechanism may be modified insofar as physical arrangement is concerned as long as the ultimate mechanical and electrical objectives are attained. Thus, the above description should be considered illustrative and not as limiting the scope of the following claim.

I claim:

A flaring machine for hollow tubing comprising, in combination, a base, a vise disposed on said base, said vise having a stationary jaw and a movable jaw, said stationary and said movble jaws having portions thereon adapted to releasably position said hollow tubing therebetween, an electrical system for controlling a programing sequence for said flaring machine including a switching mechanism slidably disposed on said stationary jaw of said vise having an electrical contact extending therefrom, said electrical contact adapted to be positioned with respect to said hollow tubing to initiate said electrical system upon engagement thereof by said hollow tubing, and a movable power member having a heated floating end assembly, a flaring member positioned at one end of said heated floating end assembly generally concentric with said hollow tubing, said movable jaw of said vise responsive to the said initiation of said electrical system to grip said hollow tubing and to initiate movement of said power member, where said movable jaw of said vise automatically controls the slidable movement of said switching mechanism.

References Cited in the file of this patent

UNITED STATES PATENTS

| 333,410 | Hawkins | Dec. 29, 1885 |
| 2,265,111 | Brown | Dec. 2, 1941 |
| 2,438,999 | Hartley et al. | Apr. 6, 1948 |
| 2,569,523 | Hahn et al. | Oct. 2, 1951 |
| 2,632,936 | Skipper et al. | Mar. 31, 1953 |
| 2,862,232 | Rekettye | Dec. 8, 1958 |

FOREIGN PATENTS

| 639,997 | Great Britain | July 12, 1950 |

OTHER REFERENCES

Kwik-Flare, a Precision Built Flaring Tool, published by J & J Manufacturing and Sales Corp., San Marino, Calif., received in Patent Office Dec. 7, 1957.

"New High Speed Flaring Machine," published by Automation Associates, Inc., Madison Heights, Mich., Bulletin 581, received in Patent Office Jan. 15, 1959.